United States Patent
Han et al.

(10) Patent No.: US 10,901,810 B2
(45) Date of Patent: Jan. 26, 2021

(54) EVENT-BASED RECORD AND REPLAY FOR ADVANCED APPLICATIONS

(71) Applicants: INTEL CORPORATION, Santa Clara, CA (US); Junchao Han, Shanghai (CN); Junyong Ding, Shanghai (CN); Yongnian Le, Shanghai (CN); Kangyuan Shu, Shanghai (CN)

(72) Inventors: Junchao Han, Shanghai (CN); Junyong Ding, Shanghai (CN); Yongnian Le, Shanghai (CN); Kangyuan Shu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/311,147

(22) PCT Filed: May 14, 2014

(86) PCT No.: PCT/CN2014/077435
§ 371 (c)(1),
(2) Date: Nov. 14, 2016

(87) PCT Pub. No.: WO2015/172326
PCT Pub. Date: Nov. 19, 2015

(65) Prior Publication Data
US 2017/0075738 A1    Mar. 16, 2017

(51) Int. Cl.
*G06F 9/54* (2006.01)
*H04L 29/08* (2006.01)
(Continued)

(52) U.S. Cl.
CPC ............ *G06F 9/542* (2013.01); *G06F 11/362* (2013.01); *G06Q 10/06* (2013.01); *H04L 67/10* (2013.01)

(58) Field of Classification Search
None
See application file for complete search history.

(56) References Cited

U.S. PATENT DOCUMENTS 8,402,318 B2    3/2013  Nieh et al.
8,578,340 B1 *  11/2013  Daudel ............... G06F 9/45504
                                                       710/266
(Continued)

FOREIGN PATENT DOCUMENTS

CN       101399821 A        4/2009
JP       A-2010020562       1/2010

OTHER PUBLICATIONS

International Search Report and Written Opinion dated Feb. 27, 2015 from International Application No. PCT/CN2014/077435, 12 pages.

(Continued)

*Primary Examiner* — Tuan C Dao
*Assistant Examiner* — William C Wood
(74) *Attorney, Agent, or Firm* — Schwabe, Williamson & Wyatt, P.C.

(57) ABSTRACT

Technologies are presented that allow application events to be recorded and replayed in a reliable and deterministic manner. A computing system may include a memory and a processor communicatively coupled with the memory. The processor may execute application logic of an application, record events associated with the application based on invocation of functions associated with the events, and store the recorded events in the memory for future playback. Recorded events may include, for example, user interactions, timing events, network downloads, callbacks, web worker tasks, etc. The recording of the events may include recording top-level functions of each event according to their order, and recording associated data including function parameters and/or return values. The recorded events may be (Continued)

replayed in order using the recorded associated data while suppressing non-recorded events.

17 Claims, 4 Drawing Sheets

(51) Int. Cl.
  *G06Q 10/06* (2012.01)
  *G06F 11/36* (2006.01)

(56) References Cited

U.S. PATENT DOCUMENTS

| | | | |
|---|---|---|---|
| 2005/0050386 A1* | 3/2005 | Reinhardt | G06F 11/1482 714/13 |
| 2009/0089404 A1 | 4/2009 | Guo | |
| 2009/0133033 A1* | 5/2009 | Lindo | G06F 11/3624 718/108 |
| 2010/0251031 A1* | 9/2010 | Nieh | G06F 11/3419 714/45 |

OTHER PUBLICATIONS

Office Action dated Oct. 4, 2017 for Japanese Patent Application No. JP2016-567661, 10 pages.
Office Action dated Sep. 4, 2018 for Japanese Patent Application No. JP2016-567661, 13 pages.
Shubu Mukherjee "Architecture Design for Soft Errors", 2008, 14 pages, Burlington, MA.
Shubu Mukherjee "Architecture Design for Soft Errors", Chapter 7.6.1, 2008, 14 pages, Burlington, MA.

\* cited by examiner

EVENT-BASED RECORD AND REPLAY FOR ADVANCED APPLICATIONS

TECHNICAL FIELD

The technologies described herein generally relate to record and replay of computing system applications.

BACKGROUND

It may be desirable to construct automated and repeatable test cases or workloads of computer system applications for application analysis, debugging, tuning, etc. This may be critical for complex applications, such as, for example, web applications (e.g., an application accessed over the Internet) and runtimes, especially in light of the advanced and fast evolving HTML5 and open web platform technologies. For such complex applications, it may be a challenge to record an application flow and exactly repeat what was captured during the recording phase. Reproducibility and reliability may be significantly impacted by various non-deterministic characteristics of the application, which may result in inconsistent or even completely wrong behavior in replay.

Current record and replay solutions employ time-based recording and replay, in which inputs to an application may be captured and repeated using similar timing (e.g., based on recorded timestamps) to recreate the application flow. During replay, the recorded inputs are simulated using the recorded timing of those inputs. A drawback to such a solution is that the randomness of some applications (e.g., web applications) may produce a significant variance in terms of "time" in the replay phase, which may change the desired behavior unexpectedly. For example, during replay, the loading of a required resource may be slower than it was during recording, which may cause an error or unexpected result if further simulation related to inputs (e.g., user actions) still occur according to recorded time. In another example, callbacks (e.g., timers, animations, etc.) may be invoked in a different sequence in replay if their order is not defined or synchronized and/or also if runtime is multi-threaded. In yet another example, if the timer used to record timestamps during a recording phase is not accurate, this inaccuracy may be propagated in replay producing a completely unexpected application flow. Current solutions that attempt to avoid these issues are time-based and may not be fully reliable.

BRIEF DESCRIPTION OF THE DRAWINGS/FIGURES

Figure 1:
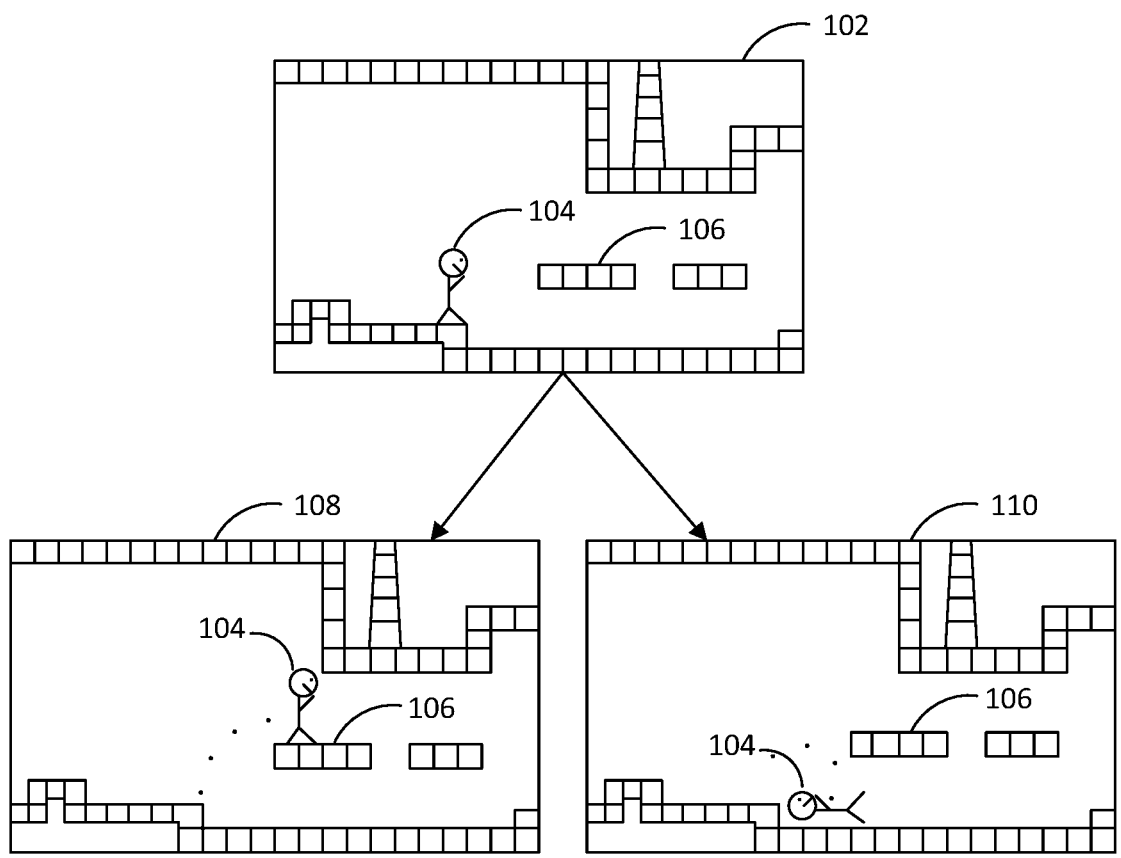
FIG. 1 is a block diagram of an example application, according to an embodiment.

In the drawings, the leftmost digit(s) of a reference number may identify the drawing in which the reference number first appears.

DETAILED DESCRIPTION

In the embodiments described herein, application events may be recorded and replayed in a reliable and deterministic manner. With this technology, non-deterministic behaviors of an application may be recorded in a function invocation event-based manner and managed during replay to behave in exactly the same way as when recorded. Replay may be intrinsically deterministic and repeatable due to the elimination of potential randomness.

As discussed above, currently used record and replay techniques employ time-based recording and replay, in which inputs to an application may be captured and repeated using similar timing (e.g., based on recorded timestamps) to recreate the application flow. During replay, the recorded inputs are simulated using the recorded timing of those inputs. With these time-based techniques, however, randomness of some applications may produce a significant variance in terms of "time" in the replay phase, which may change the desired behavior unexpectedly. FIG. 1 is a block diagram of an example application in which this issue is illustrated in a simplified manner. In FIG. 1, a recorded game is being replayed in simulation. In screen shot 102, player 104 is planning to jump onto platform 106. In other words, a jump event is about to be dispatched. If the game was recorded using a time-based recording technique, the recorded timestamps may need to be nearly exactly (if not exactly) what they were in the originally played game in order for player 104 to successfully jump onto platform 106 as shown in screen shot 108. If the timestamps are even just slightly off, player 104 may fall to the ground instead, as shown in screen shot 110. Very small variances in replay may make the application behave very differently than expected, which may cause the replayed simulation fail to fulfill its purpose.

In the embodiments described herein, the record and replay techniques used are not time-based as in previous solutions. Rather, an application trace (i.e., recording) is event-based, based on function invocation. Functions may be recorded into a trace even if they may be invoked in a non-deterministic order or if they may produce non-deterministic results. Examples of functions that may be invoked in a non-deterministic order may include, but are not to be limited to, callbacks (e.g., animation callbacks), network downloads, multithreading web workers, etc. During replay of recorded functions of this type, the functions are replayed in the same order as recorded. Examples of functions that may produce non-deterministic results may include, for example, but are not to be limited to, application programming interfaces (APIs) (e.g., JavaScript APIs, such as Math.random( ) Date.now( ) etc.). During replay of recorded functions of this type, the same output is generated as was recorded. The applications that are recorded in this way are reliably repeatable because external input to the application may be fixed such that the output is the same.

A running application involves multiple events including, but not limited to, user inputs, timing events, network events (e.g., if there are multiple players of a game), etc. Each event may be handled by a corresponding event handler function. Events may occur in a non-deterministic order and/or may return non-deterministic results. During recording, invocation of each top-level function may be recorded according to their order, which may form a function execution sequence. This is demonstrated in FIG. 2, according to an embodiment. In record phase 220 of FIG. 2, a main logic function 222 (A1) is recorded and followed by, in order, recording of a user input 224 (B1), a network event 226 (D1), a main logic function 228 (A2), and a timing event 230 (C1). Thus, the recorded application includes, in an overall order 232, "A1 B1 D1 A2 C1". Along with the functions, data associated with each function, including, for example, function parameters and return values (e.g., return values of APIs) may also be recorded. This results in, after recording, a complete trace of function invocation order with related execution data context, which may fully determine logic behavior of the originally executed application upon replay.

Figure 2:
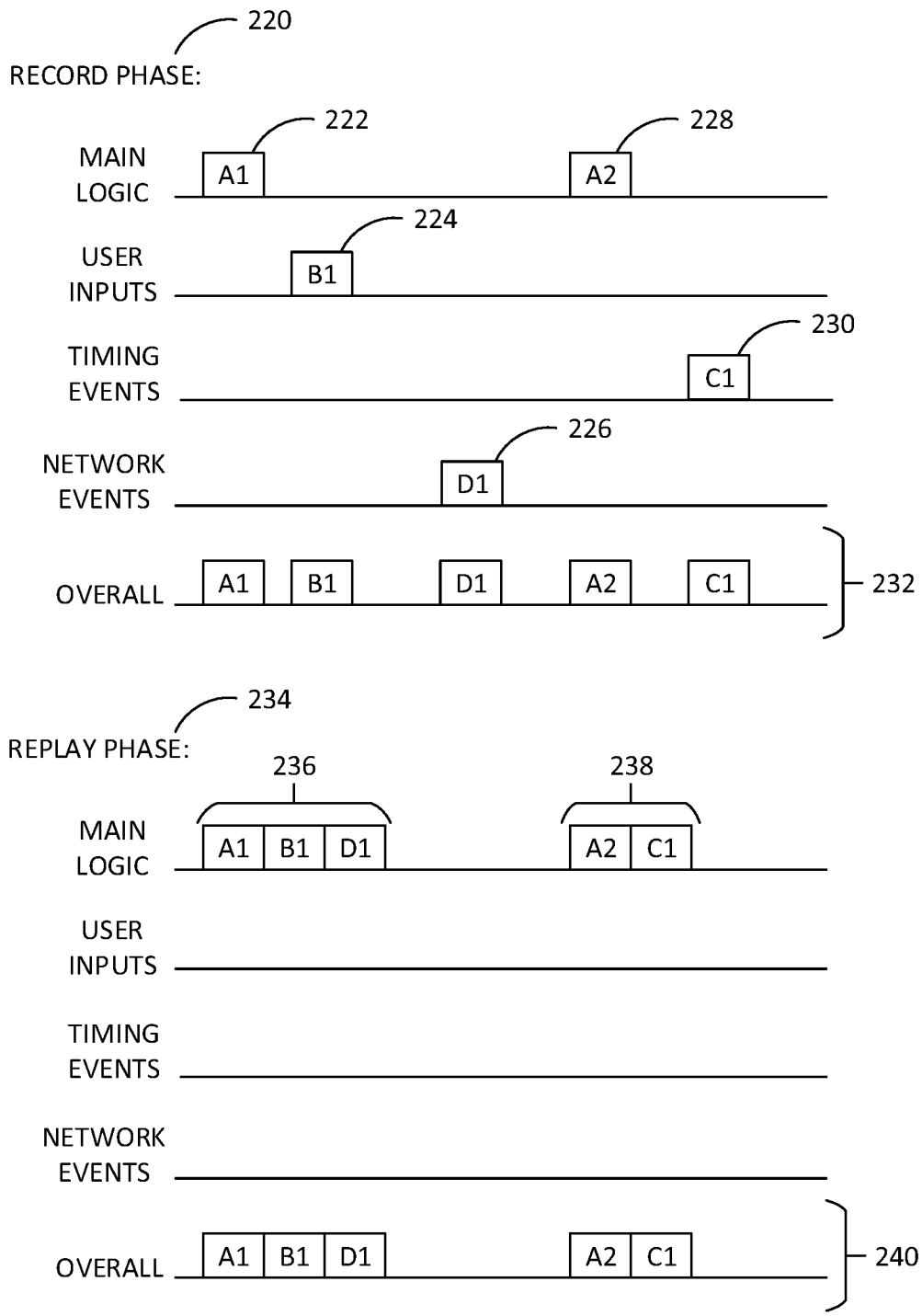
FIG. 2 is a block diagram of an example event order of record and replay phases, according to an embodiment.

In replay phase 234 of FIG. 2, execution flow and scheduling of functions A1, B1, D1, A2, and C1 may be managed according to the trace recorded during record phase 220. The replay of the application may be managed to run in an event-free manner so that application execution will not be influenced by non-deterministic event handlers. Various events either will not exist during the automated replay (e.g., user inputs), or will be suppressed. The events that will be suppressed (e.g., timing events, network events, etc.) may be hooked and bypassed. Without any unmanaged events interjecting into the application flow, the overall function execution order may be determined by main logic in a controlled manner. These non-main-logic events (e.g., user input events, timing events, network events, etc.), may be wrapped into their preceding main logic event to contain event handlers according to the recorded function execution order. In the example shown in FIG. 2, main logic function A1 is wrapped into event block 236 ("A1 B1 D1"), and main logic function A2 is wrapped into event block 238 ("A2 C1"). As a result, in replay phase 234, overall function execution sequence 240 remains "A1 B1 D1 A2 C1". Recorded function parameters and return values may be provided and aligned during replay so that every function will be executed in the same data context as in record phase 220. With the same function invocation order under the same data context, applications may be strictly replayed with exactly the same logic and deterministic behavior as in the record phase.

In embodiments, there may be multiple possible implementations to record and replay at different layers of the software stack. For example, the techniques described herein may be implemented in one or more of a script engine (e.g., JavaScript engine), application layer (e.g., JavaScript), browse engine (e.g., as an extension), operating system, etc. These examples are for illustration purposes only, and are not meant to be limiting.

As an example, a tool may be written (e.g., in JavaScript) to record and replay various applications (e.g., web applications). The flow of the application may be driven by various functions that may be traced by the tool (e.g., animation callbacks, timeout callbacks, user event handlers, etc.). The tool may handle execution of the animation callbacks as main application logic since animation callbacks are invoked by, for example, a browser when a screen painting is needed. In this way, the rendering nature of the application may be maintained. Timeout callbacks and user event handlers may be treated as events that will be invoked automatically by the tool according to the recording trace. The tool may hook and wrap the built-in functions (e.g., built-in JavaScript functions if the tool is written in JavaScript), and may utilize the dynamic characteristic of the scripting language.

Figure 3:
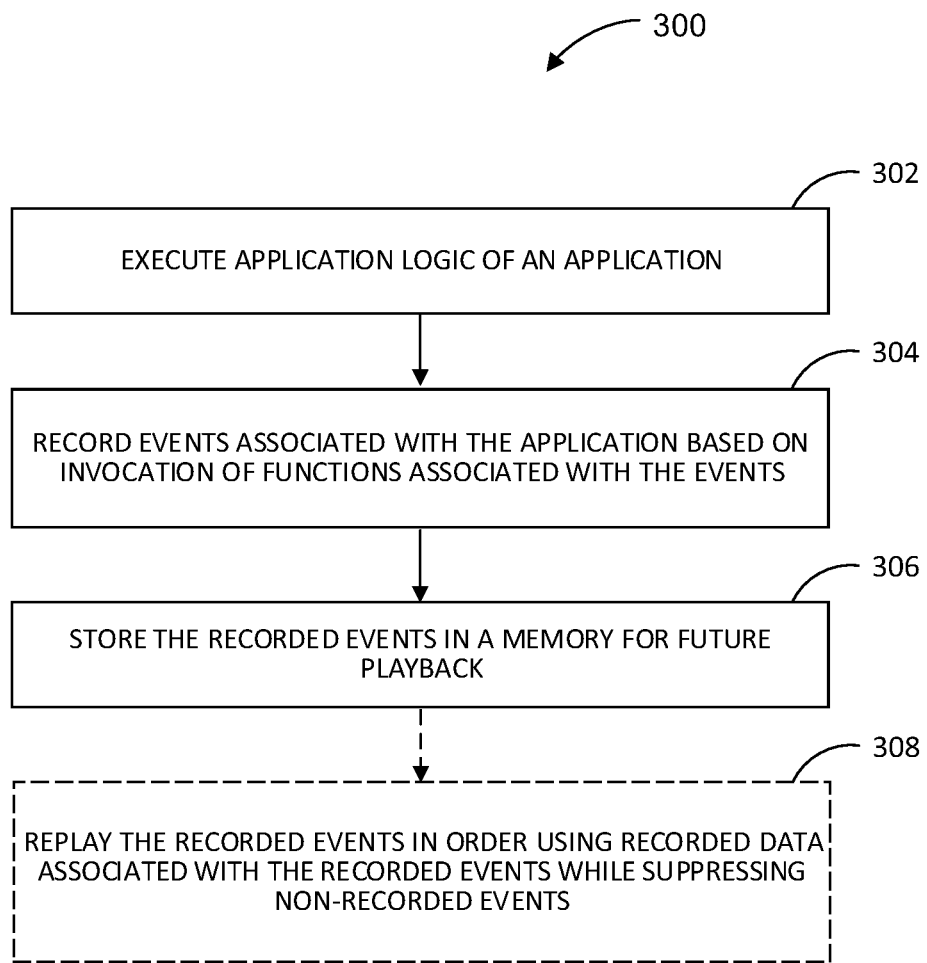
FIG. 3 is an example flow chart depicting a method of event record and replay, according to an embodiment.

FIG. 3 is an example flow chart depicting a method 300 of event record and replay, according to an embodiment. At 302, application logic of an application may be executed. At 304, events associated with the application may be recorded based on invocation of functions associated with the events. The recording of events may include recording top-level events according to their order, and may include recording data associated with the recorded events, such as, for example, function parameters used and return values. At 306, recorded events may be stored in a memory for future playback. At 308, the recorded events may be replayed in order using recorded data associated with the recorded events while suppressing non-recorded events that may try to execute during replay.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 4:
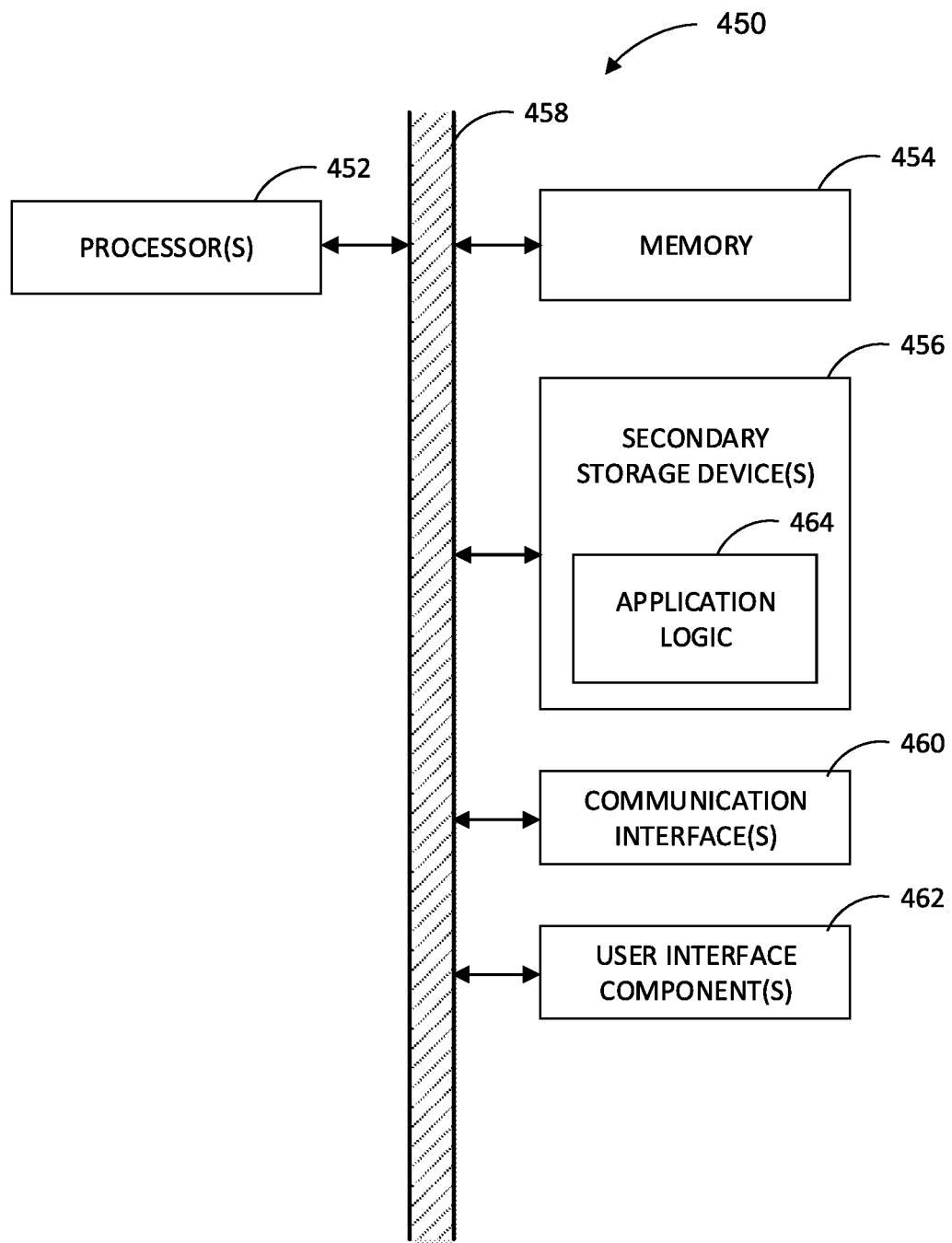
FIG. 4 is a block diagram of an example computing device, according to an embodiment.

As stated above, in embodiments, some or all of the processing described herein may be implemented as hardware, software, and/or firmware. Such embodiments may be illustrated in the context of an example computing system 450 as shown in FIG. 4. Computing system 450 may include one or more processors 452 connected to memory 454 and one or more secondary storage devices 456 by a link 458 or similar mechanism. Processor(s) 452 may include one or more logic units for carrying out the methods described herein. One of ordinary skill in the art would recognize that the functions of the logic units may be executed by a single logic unit, or any number of logic units. Computing system 450 may optionally include communication interface(s) 460 and/or user interface components 462. The communication interface(s) 460 may be implemented in hardware or a combination of hardware and software, and may provide a wired or wireless network interface to a network. The user interface components 462 may include, for example, a touchscreen, a display, one or more user input components (e.g., a keyboard, a mouse, etc.), a speaker, or the like, or any combination thereof. Data and/or graphics processed via the methods described herein may be displayed on one or more user interface components. The one or more secondary storage devices 456 may be, for example, one or more hard drives or the like, and may store logic 464 (e.g., application logic) to be executed by processor(s) 452. In an embodiment, processor(s) 452 may be microprocessors, and logic 464 may be stored or loaded into memory 454 for execution by processor(s) 452 to provide the functions described herein. Recorded events and associated data may also be stored in memory 454, according to embodiments described herein. Note that while not shown, computing system 450 may include additional components.

Technologies disclosed herein allow application events to be recorded and replayed in a reliable and deterministic manner. Non-deterministic behaviors of an application may be recorded in a function invocation event-based manner and managed during replay to behave in exactly the same way as when recorded. Replay may be intrinsically deterministic and repeatable due to the elimination of potential randomness. As discussed above, the use of reliable and deterministic record and replay technology for workloads, benchmarks, and test cases may be critical for application analysis, debugging, and tuning. The technologies described herein are particularly useful for advanced web applications which may contain rich animations and user interactions (e.g., web workers, web-based games (e.g., slicing games, shooting games, car racing games, etc.), online productivity tools (email, document management systems, etc.), etc.). Such emerging web applications may be very difficult to replay in a consistent and matched manner using traditional record and replay solutions because a small variance may make a big difference in behavior during the replay. The techniques described herein avoid the potential problem of traditional solutions. For example, for some applications, better replay results may be obtained by invoking functions based on screen or frame changes rather than on timestamps, as time-based techniques may result in unexpected behavior upon replay.

There are various advantages of using the technologies described herein. For example, one advantage is that an application may be recorded on one platform and replayed on another platform without loss of reliable repeatability. Many other advantages may also be contemplated.

The particular examples and scenarios used in this document are for ease of understanding and are not to be limiting. Features described herein may be used in many other contexts, as would be understood by one of ordinary skill in the art.

The following examples pertain to further embodiments.

Example 1 may include a computing system, comprising a memory and a processor, communicatively coupled with the memory, to execute application logic of an application; record events associated with the application based on invocation of functions associated with the events; and store the recorded events in the memory for future playback.

Example 2 may include the subject matter of Example 1, wherein the application is one or more of a web application, a game application, or a productivity application.

Example 3 may include the subject matter of Example 1 or Example 2, wherein the events include one or more of user interactions, timing events, network downloads, callbacks, or web worker tasks.

Example 4 may include the subject matter of any one of Examples 1-3, wherein the recording of the events includes recording top-level functions of each event according to their order, and recording associated data including one or more of function parameters or return values.

Example 5 may include the subject matter of Example 4, wherein the processor is further to replay the recorded events in order using the recorded associated data while suppressing non-recorded events.

Example 6 may include the subject matter of Example 5, wherein the recording and the replaying is done at one or more different layers of a software stack.

Example 7 may include the subject matter of any one of Examples 1-6, wherein the recording of the events includes wrapping non-main-logic events into their preceding main logic event.

In Example 8, any one of Examples 1-7 may optionally include a communication interface communicatively coupled with the processor and a network; a user interface including a navigation device and display, the user interface communicatively coupled with the processor; and storage that stores the application logic, the storage communicatively coupled with the processor, wherein the processor is to load and execute the application logic, wherein the execution of the application logic includes presenting the application via the user interface.

Example 9 may include at least one computer program product, including at least one computer readable medium having computer program logic stored therein, the computer program logic including logic to cause a processor to: execute application logic of an application; record events associated with the application based on invocation of functions associated with the events; and store the recorded events in a memory for future playback.

Example 10 may include the subject matter of Example 9, wherein the recording of the events includes recording top-level functions of each event according to their order, and recording associated data including one or more of function parameters or return values.

Example 11 may include the subject matter of Example 10, wherein the computer program logic further includes logic to cause the processor to replay the recorded events in order using the recorded associated data while suppressing non-recorded events.

Example 12 may include the subject matter of Example 11, wherein the recording and the replaying is done at one or more different layers of a software stack.

Example 13 may include the subject matter of any one of Examples 9-12, wherein the recording of the events includes wrapping non-main-logic events into their preceding main logic event.

Example 14 may include a computing apparatus comprising: means for executing application logic of an application; means for recording events associated with the application based on invocation of functions associated with the events; and means for storing the recorded events in a memory for future playback.

Example 15 may include the subject matter of Example 14, wherein the means for recording of the events includes means for recording top-level functions of each event according to their order, and for recording associated data including one or more of function parameters or return values.

In Example 16, Example 15 may optionally include means for replaying the recorded events in order using the recorded associated data while suppressing non-recorded events.

Example 17 may include the subject matter of Example 16, wherein the recording and the replaying is done at one or more different layers of a software stack.

Example 18 may include the subject matter of any one of Examples 14-17, wherein the means for recording of the events includes means for wrapping non-main-logic events into their preceding main logic event.

Example 19 may include a method of application processing, comprising: executing, by a processor, application logic of an application; recording, by the processor, events associated with the application based on invocation of functions associated with the events; and storing, by the processor, the recorded events in a memory for future playback.

Example 20 may include the subject matter of Example 19, wherein the recording of the events includes recording top-level functions of each event according to their order, and recording associated data including one or more of function parameters or return values.

In Example 21, Example 20 may optionally include replaying the recorded events in order using the recorded associated data while suppressing non-recorded events.

Example 22 may include the subject matter of Example 21, wherein the recording and the replaying is done at one or more different layers of a software stack.

Example 23 may include the subject matter of any one of Examples 19-22, wherein the recording of the events includes wrapping non-main-logic events into their preceding main logic event.

Example 24 may include at least one machine readable medium comprising a plurality of instructions that in response to being executed on a computing device, cause the computing device to carry out a method according to any one of Examples 19-23.

Example 25 may include an apparatus to perform the method of any one of Examples 19-23.

Example 26 may include a computer system to perform the method of any one of Examples 19-23.

Example 27 may include a machine to perform the method of any one of Examples 19-23.

Example 28 may include an apparatus comprising means for performing the method of any one of Examples 19-23.

Example 29 may include a computing device comprising memory and a chipset to perform the method of any one of Examples 19-23.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the exemplary embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:

1. An apparatus to facilitate a replaying of an application, the apparatus comprising:
   memory circuitry arranged to:
      store or be loaded with application logic of the application, and
      store or be loaded with recordation logic; and
   processor circuitry coupled with the memory circuitry, wherein the processor circuitry is arranged to:
      execute the application logic, and
      execute the recordation logic in response to detection of one or more events that are generated based on invocation of one or more functions during execution of the application logic, wherein the recordation logic is executed to:
      record main logic events of the one or more events and non-main logic events of the one or more events,
      wrap the non-main logic events with a preceding main logic event into respective event blocks such that each of the respective event blocks includes one main logic event and one or more non-main logic events recorded subsequent to the one main logic event, and
      control storage of the respective event blocks in the memory circuitry for future playback.

2. The apparatus of claim 1, wherein the application includes one or more of a web application, a game application, or a productivity application.

3. The apparatus of claim 1, wherein the non-main logic events include one or more of user interactions, timing events, network downloads, callbacks, or web worker tasks.

4. The apparatus of claim 1, wherein the processor circuitry is arranged to operate the recordation logic to:
   record top-level functions of each event of the one or more events according to an order of the one or more events, and
   record data associated with each event, wherein the data associated with the one or more events includes one or more of function parameters or return values.

5. The apparatus of claim 4, wherein the processor circuitry is arranged to operate the recordation logic to:
   replay the wrapped recorded events in order using the recorded data associated with the recorded events, and
   suppress replay of the non-main logic events.

6. The apparatus of claim 5, wherein the processor circuitry is arranged to operate the recordation logic to record and replay the one or more events at one or more layers of a software stack.

7. The apparatus of claim 1, further comprising:
   a communication interface communicatively coupled with the processor circuitry, the communication interface arranged to connect to a network;
   a user interface including a navigation device and display, the user interface communicatively coupled with the processor circuitry; and
   storage circuitry communicatively coupled with the processor circuitry, the storage circuitry configured to store the application logic and recordation logic,
   wherein the processor circuitry is arranged to load and execute the application logic and the recordation logic from the storage circuitry into the memory circuitry, wherein the execution of the application logic includes presenting the application via the user interface.

8. The apparatus of claim 1, wherein the one or more non-main logic events that are recorded subsequent to the one main logic event are recorded prior to recording another main logic event that follows the one main logic event during execution of the application logic.

9. The apparatus of claim 1, wherein, to wrap the non-main logic events with the preceding main logic event into the respective event blocks, the processor circuitry is further arranged to:
   wrap the one main logic event into an event block with the one or more non-main logic events after recording one or more other main logic events of the one or more events.

10. At least one non-transitory computer readable medium (NTCRM) encoded with a computer program comprising instructions to facilitate a replaying of an application, wherein execution of the instructions is to cause a processor to:
   execute the application;
   record events associated with the application in response to detection of the events, wherein the events are generated based on invocation of one or more functions during execution of the application, wherein the events include main logic events and non-main logic events;
   wrap the recorded non-main logic events with an individual preceding main logic event into respective event blocks such that each of the respective event blocks includes one main logic event and one or more non-main logic events recorded subsequent to the one main logic event, and control storage of the respective event blocks in a memory for future playback.

11. The at least one NTCRM of claim 10, wherein execution of the instructions is to cause the processor to:

record top-level functions of each event according to an order of execution, and record data associated with each event, the data associated with each event including one or more of function parameters or return values.

12. The at least one NTCRM of claim 11, wherein execution of the instructions is to cause the processor to:

replay the recorded events in order using the recorded associated data.

13. The at least one NTCRM of claim 12, wherein execution of the instructions is to cause the processor to replay each event at one or more layers of a software stack.

14. A method to facilitate a replaying of an application, comprising, on a processor:

executing instructions of the application;

recording events generated based on invocation of one or more functions during execution of the application, the events including main logic events and non-main logic events;

wrap the recorded non-main logic events with a preceding main logic event into respective event blocks such that each of the respective event blocks includes one main logic event and one or more non-main logic events recorded subsequent to the one main logic event, and storing the respective event blocks in a memory for future playback.

15. The method of claim 14, wherein the recording includes recording top-level functions of each event according to their order, and recording data associated with each event including one or more of function parameters or return values.

16. The method of claim 15, further comprising:

replaying the recorded events in order using the recorded associated data.

17. The method of claim 16, further including performing the replaying at one or more layers of a software stack.

* * * * *